(12) United States Patent
Wu et al.

(10) Patent No.: US 12,547,682 B2
(45) Date of Patent: Feb. 10, 2026

(54) SECURE MACHINE LEARNING MODEL PROCESSING

(71) Applicant: ALIBABA GROUP HOLDING LIMITED, Grand Cayman (KY)

(72) Inventors: Caidi Wu, Hangzhou (CN); Lufei Wei, Hangzhou (CN); Liang Cheng, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 219 days.

(21) Appl. No.: 18/261,603

(22) PCT Filed: Jan. 10, 2022

(86) PCT No.: PCT/CN2022/070959
§ 371 (c)(1),
(2) Date: Jul. 14, 2023

(87) PCT Pub. No.: WO2022/152071
PCT Pub. Date: Jul. 21, 2022

(65) Prior Publication Data
US 2024/0080192 A1 Mar. 7, 2024

(30) Foreign Application Priority Data
Jan. 15, 2021 (CN) .......................... 202110057899.0

(51) Int. Cl.
*G06F 21/12* (2013.01)
*G06F 21/53* (2013.01)
*G06F 21/62* (2013.01)

(52) U.S. Cl.
CPC .......... *G06F 21/123* (2013.01); *G06F 21/125* (2013.01); *G06F 21/53* (2013.01); *G06F 21/62* (2013.01)

(58) Field of Classification Search
CPC ...... G06F 21/123; G06F 21/125; G06F 21/53; G06F 21/62; G06F 21/57; H04L 9/0897; G06N 20/00
See application file for complete search history.

(56) References Cited

U.S. PATENT DOCUMENTS

| 2018/0375638 A1* | 12/2018 | Khanna | H04L 9/0894 |
| 2019/0392305 A1* | 12/2019 | Gu | G06F 21/53 |

(Continued)

FOREIGN PATENT DOCUMENTS

| CN | 110704850 A | 1/2020 |
| CN | 110750801 A | 2/2020 |
| CN | 111444528 A | 7/2020 |

OTHER PUBLICATIONS

Narra KG, Lin Z, Wang Y, Balasubramaniam K, Annavaram M. Privacy-preserving inference in machine learning services using trusted execution environments. arXiv preprint arXiv:1912.03485. Dec. 7, 2019. (Year: 2019).*

(Continued)

*Primary Examiner* — Robert B Leung
(74) *Attorney, Agent, or Firm* — Haynes and Boone, LLP

(57) ABSTRACT

A data processing method, apparatus and system are disclosed. The method includes: splitting a preset data processing module from a machine learning model, to generate a security application module configured for performing encryption calculation on data input into the machine learning model; taking, through a preset operator, an output value of an operation layer in the split machine learning model as an input value to be input into the security application module, and inputting the input value into the security application module; performing, through the security application module, subgraph calculation in an isolated operating environment according to the input value, to obtain a calculation result; returning the calculation result to the preset (Continued)

operator. The present application solves the technical problem of high computational pressure of TEE model due to that different reasoning frameworks need to be adapted to different customer requirements in the TEE model in related technologies.

15 Claims, 3 Drawing Sheets

(56) References Cited

U.S. PATENT DOCUMENTS

| | | |
|---|---|---|
| 2020/0151436 A1* | 5/2020 | Guo .................. G06F 9/545 |
| 2020/0162256 A1 | 5/2020 | Pourtabatabaie et al. |
| 2021/0011996 A1* | 1/2021 | Li .................. G06F 12/1009 |
| 2022/0197994 A1* | 6/2022 | Sternby .............. G06F 21/54 |

OTHER PUBLICATIONS

International Search Report mailed Mar. 25, 2022 in International Application No. PCT/CN2022/070959, 5 pages.

* cited by examiner

SECURE MACHINE LEARNING MODEL PROCESSING

CROSS-REFERENCE TO RELATED APPLICATIONS

The present application is a U.S. National Stage patent application of International Patent Application No. PCT/CN2022/070959, filed Jan. 10, 2022, which claims priority to Chinese patent application No. 202110057899.0, filed on Jan. 15, 2021 and entitled "DATA PROCESSING METHOD, APPARATUS AND SYSTEM", the benefit of which is claimed and the disclosures of which are incorporated herein by reference in their entirety.

TECHNICAL FIELD

The present application relates to a field of internet technology, and in particular to a data processing method, apparatus and system.

BACKGROUND

A Trusted Execution Environment (TEE for short, a credible execution environment and an independent operating system) may ensure, through isolation of hardware, the storage, processing and protection of sensitive data in an isolated and trusted environment. The TEE is widely applied to various security applications, such as payment, fingerprints, and digital rights management (DRM for short). Machine learning (Artificial Intelligence, AI for short) refers to training with a large amount of data, and then applying a result obtained through learning to subsequent data decision-making/prediction. AI has been currently widely applied to various scenarios, such as mode recognition, computer vision, and autonomous driving, etc. With the widespread applications of AI, there are more and more security issues in the AI field, such as model stealing, misleading reasoning results, and sensitive data leakage, etc.

In actual AI applications, in order to ensure the security, such as model security, and privacy security, it requires model encryption, model decryption and reasoning to be completed in the trusted execution environment. Meanwhile, the performance of performing reasoning in the TEE and the impact on an original application at a rich execution environment (REE for short) side are considered, wherein the REE is opposite to the TEE.

In related technologies, because different reasoning frameworks are adopted for different customer requirements, the requirements of different customers are acquired on the REE side, and then the different reasoning frameworks are adapted in the TEE, thereby increasing the development efforts of the TEE.

For the problem of high computational pressure of the TEE model due to that deterrent reasoning frameworks need to be adapted to different customer requirements in the TEE model in the related technologies, an effective solution has not yet been proposed.

SUMMARY

Embodiments of the present application provide a data processing method, apparatus and system, in order to solve the technical problem of high computational pressure of the TEE model due to that different reasoning frameworks need to be adapted to different customer requirements in the TEE model in the related technologies.

According to one aspect of the embodiments of the present application, a data processing method is provided, including: splitting a preset data processing module from a machine learning model, to generate a security application module, wherein the security application module is configured for performing encryption calculation on data input into the machine learning model; taking, through a preset operator, an output value of an operation layer in the split machine learning model as an input value to be input into the security application module, and inputting the input value into the security application module; performing, through the security application module, subgraph calculation in an isolated operating environment according to the input value, to obtain a calculation result, and returning the calculation result to the preset operator.

Optionally, splitting the preset data processing module from the machine learning model, to generate the security application module, includes: splitting, by a preset tool, the preset data processing module from the machine learning model, and generating the security application module according to the preset data processing module.

Further, optionally, generating the security application module according to the preset data processing module, includes: optimizing and encrypting, by a heterogeneous accelerated compiler, the preset data processing module, to obtain the security application module.

Optionally, optimizing and encrypting, by the heterogeneous accelerated compiler, the preset data processing module, to obtain the security application module, includes: configuring a network structure in the machine learning model to a specified position of the security application module; and encrypting the specified position of the security application module, to obtain the encrypted security application module.

Optionally, taking, through the preset operator, the output value of the operation layer in the split machine learning model as the input value to be input into the security application module, and inputting the input value into the security application module, includes, in a case where the operation layer includes a first operation layer, acquiring, through the preset operator, an output value of the first operation layer in the split machine learning model; taking the output value as the input value to be input into the security application module; and inputting the input value into the security application module.

Further, optionally, performing, through the security application module, the subgraph calculation in the isolated operating environment according to the input value, to obtain the calculation result, include: detecting, according to the input value, whether there is use authorization for the split machine learning model; in a case where it is detected that there is the use authorization for the split machine learning model, or in a case where it is detected that no authorization is required for the split machine learning model, performing, through the security application module, the subgraph calculation in the isolated operating environment according to the input value, to obtain the calculation result; and in a case where it is detected that there is no use authorization for the split machine learning model, stopping the calculation.

Optionally, performing, through the security application module, the subgraph calculation in the isolated operating environment according to the input value, to obtain the calculation result, includes: allocating a corresponding application program interface according to the input value, and performing the subgraph calculation in the isolated operating environment according to the input value, to obtain the calculation result.

Further, optionally, returning the calculation result to the preset operator, includes: in a case where the operation layer further includes a second operation layer, inputting, through the preset operator, the calculation result into the second operation layer in the split machine learning model, wherein the first operation layer is before the preset operator, and the second operation layer is after the preset operator.

According to another aspect of the embodiments of the present application, a data processing method is provided, which is applied to an artificial intelligence chip, and includes: splitting, by the artificial intelligence chip, a preset data processing module from a machine learning model, to generate a security application module; acquiring, by the artificial intelligence chip, an output value of an operation layer in the split machine learning model through a preset operator, taking the output value as an input value to be input into the security application module, and inputting the input value into the security application module; and performing, by the artificial intelligence chip, encryption calculation on the input value through the security application module, to obtain a calculation result, and returning the calculation result to the preset operator.

According to another aspect of the embodiments of the present application, a data processing system is provided, including: a machine learning model, a preset tool, a first execution environment and a second execution environment, wherein the machine learning model includes a preset data processing module, the preset data processing module is obtained by splitting from the machine learning model through the preset tool, and the preset data processing module is configured in the first execution environment, to generate a security application module; and the split machine learning model is configured in the second execution environment; and the second execution environment is configured for collecting data, taking the collected data as an input value which is to be input into the security application module in the first execution environment, inputting the input value into the security application module through a preset operator, and receiving a calculation result through the preset operator, wherein the calculation result is obtained by performing, through the security application module in the first execution environment, encryption calculation on the input value.

According to another aspect of the embodiments of the present application, a data processing apparatus is also provided, including a split module, configured for splitting a preset data processing module from a machine learning model, to generate a security application module, wherein the security application module is configured for performing encryption calculation on data input into the machine learning model; an input module, configured for taking, through a preset operator, an output value of an operation layer in the split machine learning model as an input value to be input into the security application module, and inputting the input value into the security application module; an acquisition module, configured for performing, through the security application module, subgraph calculation in an isolated operating environment according to the input value, to obtain a calculation result; and an interaction module, configured for returning the calculation result to the preset operator.

According to another aspect of the embodiments of the present application, a non-volatile storage medium is also provided, including a stored program, wherein the program, when running, controls a device where the non-volatile storage medium is located to implement the above method.

According to another aspect of the embodiments of the present application, a processor is also provided. The processor is configured for running a program, wherein the program, when running, implements the above method.

In the embodiments of the present application, a preset data processing module is split from a machine learning model, to generate a security application module, wherein the security application module is configured for performing encryption calculation on data input into the machine learning model an output value of an operation layer in the split machine learning model is taken as an input value to be input into the security application module by a preset operator, and the input value is input into the security application module; the security application module performs subgraph calculation in an isolated operating environment according to the input value, to obtain a calculation result; and the calculation result is returned to the preset operator. The purpose of improving the computing power of the TEE is achieved, thereby achieving the technical effect that various reasoning frameworks are no longer integrated in the TEE, and corresponding application program call interfaces are provided for the TA that needs to run in the TEE, and in turn solving the technical problem of high computational pressure of the TEE model due to that different reasoning frameworks need to be adapted to different customer requirements in the TEE model in the related technologies.

BRIEF DESCRIPTION OF THE DRAWINGS

The drawings described herein are used to provide a further understanding of the present application, and constitute a part of the present application. The illustrative embodiments of the present application and descriptions thereof are used to explain the present application, and do not constitute an improper limitation of the present application. In the drawings.

DETAILED DESCRIPTION

Figure 1:
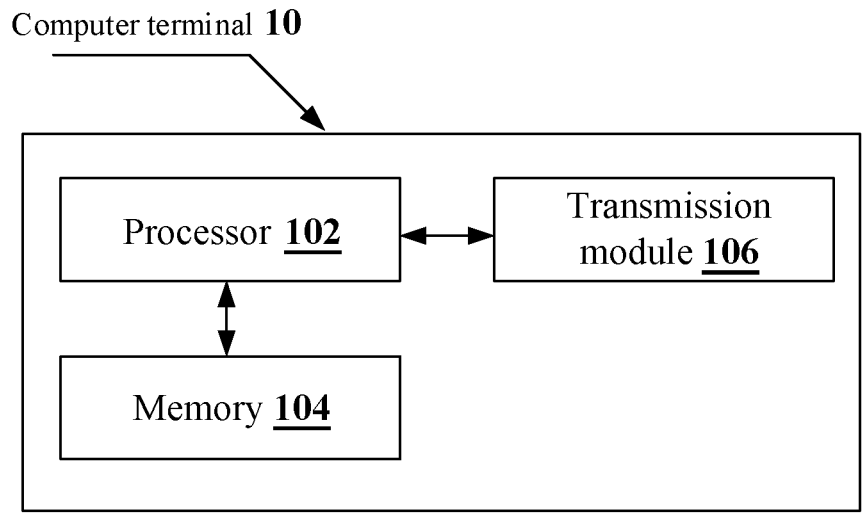
FIG. 1 is a hardware structure block diagram of a computer terminal for a data processing method according to an embodiment of the present application.

In order to enable those skilled in the art to better understand the solutions of the present application, the technical solutions of the embodiments of the present application will be described clearly and completely in combination with the drawings corresponding to the embodiments of the present application below. Obviously, the described embodiments are only some of the embodiments of the present application, rather than all embodiments. Based on the embodiments of the present application, all other embodiments obtained by those skilled in the art without any creative labors should fall within the scope of the protection of the present application.

It should be explained that terms such as "first", "second", etc. in the description and claims of the present application as well as in the above drawings are used to distinguish similar objects, instead of describing a specific order or sequence. It should be understood that data used in this way may be exchanged under appropriate circumstances, so that the embodiments of the present application described herein may be implemented in an order other than those illustrated or described herein. In addition, terms such as "including" and "having" as well as any variants thereof are intended to cover the nonexclusive inclusion. For example, processes, methods, systems, products, or devices containing a series of steps or units do not need to be limited to those steps or units clearly listed, but may include other steps or units, which are not clearly listed or are inherent to those processes, methods, products, or devices.

Technical Terms Involved in the Present Application

TEE (Trusted Execution environment): the trusted execution environment, which is an independent operating system, and used for storing, processing and protecting sensitive data.

TA (Trusted Application): a security application, an application running inside the TEE.

AI (Artificial Intelligence).

API (Application Programming Interface).

REE (Rich Execution environment): the REE is opposite to the TEE.

First Embodiment

According to an embodiment of the present application, a method embodiment of a data processing method is also provided. It should be explained that steps shown in a flow chart in the drawings may be executed in a computer system including such as a set of computer executable instructions. Moreover, the logical order is shown in the flow chart, but in some cases, the steps shown or described may be executed in a different order than the order described herein.

The method embodiment provided by the first embodiment of the present application may be executed in a mobile terminal, a computer terminal, or a similar operation device. Taking that the method embodiment is executed in the computer terminal as an example, FIG. 1 is a hardware structure block diagram of a computer terminal for a data processing method according to an embodiment of the present application. As shown in FIG. 1, the computer terminal 10 may include one or more (only one is shown in the figure) processors 102 (the processor 102 may include but not limited to a processing apparatus such as a microprocessor MCU or a programmable logic device FPGA), a memory 104 configured for storing data, and a transmission module 106 configured for implementing a communication function. Those skilled in the art may understand that the structure shown in FIG. 1 is only an example, and it does not limit the structure of the above electronic apparatus. For example, the computer terminal 10 may also include more or less components shown in FIG. 1, or have a configuration different from that shown in FIG. 1.

The memory 104 may be used to store a software program and a module of an application software, such as program instructions/modules corresponding to the data processing method according to the embodiment of the present application. The processor 102 implements various functional applications and data processing by running the software program and the module stored in the memory 104, i.e., implementing the data processing method of the above application program. The memory 104 may include a high-speed random memory, and may also include a non-volatile memory, such as one or more magnetic storage devices, a flash memory, or other non-volatile solid-state memories. In some examples, the memory 104 may further include memories remotely set relative to the processor 102, and these remote memories may be connected to the computer terminal 10 via a network. The examples of the above network include, but are not limited to, the Internet, intranets, local area networks, mobile communication networks, and combinations thereof.

The transmission module 106 is configured to receive or send data via a network. The specific example of the above network may include a wireless network provided by a communication supplier of the computer terminal 10. In an example, the transmission module 106 includes a network adapter (Network Interface Controller, NIC for short), which may be connected with other network devices through a base station, to communicate with the Internet. In an example, the transmission module 106 may be a radio frequency (RF) module, which is configured to communicate with the Internet wirelessly.

Figure 2:
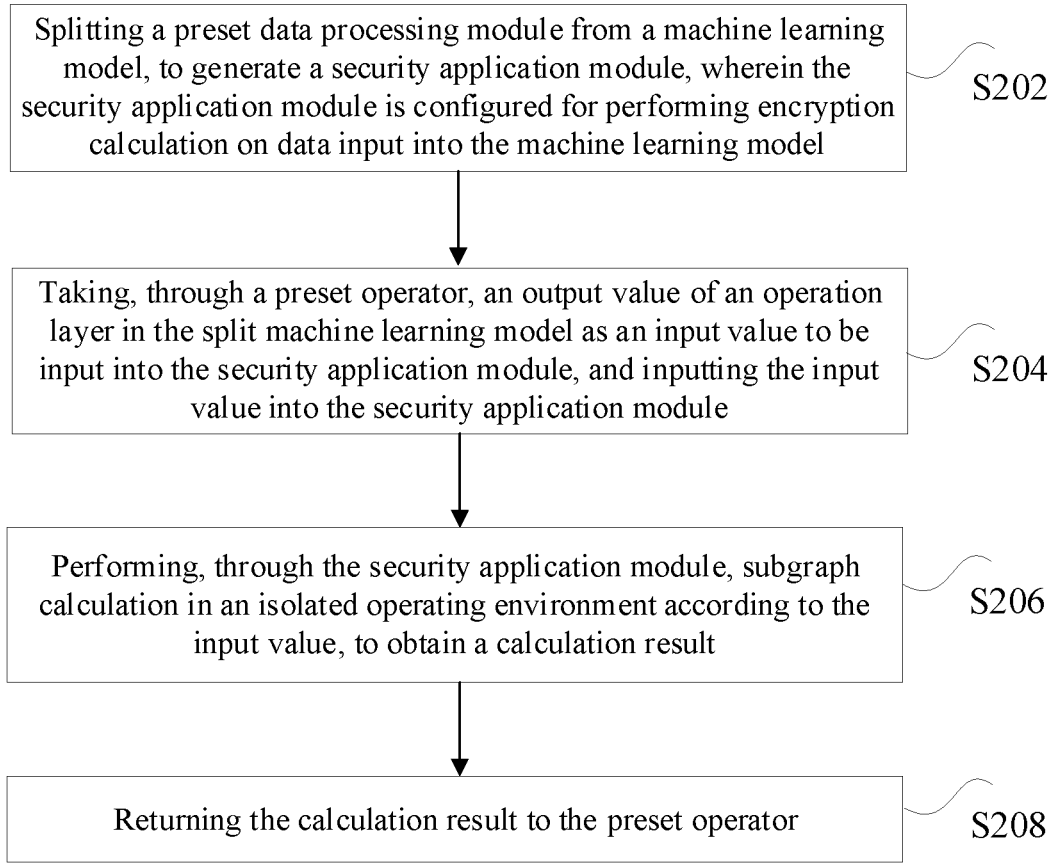
FIG. 2 is a flow chart of a data processing method according to the first embodiment of the present application.

In the above operating environment, the present application provides a data processing method as shown in FIG. 2. FIG. 2 is a flow chart of the data processing method according to the first embodiment of the present application. The data processing method provided by the embodiment of the present application specifically includes the following steps S202 to S208.

Step S202, splitting a preset data processing module from a machine learning model, to generate a security application module, wherein the security application module is configured for performing encryption calculation on data input into the machine learning model.

Figure 3:
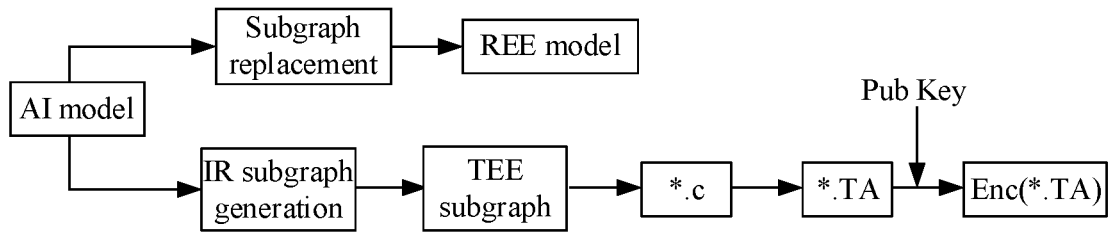
FIG. 3 is a schematic diagram illustrating the acquisition of a security application module in the data processing method according to the first embodiment of the present application.

In the above step S202 of the present application, the machine learning model in the embodiment of the present application may be an AI model, and the preset data processing module may be a part, in the AI model, used to perform confidential calculation/sensitive calculation. FIG. 3 is a schematic diagram of acquiring a security application module according to the data processing method of the first embodiment of the present application. As shown in FIG. 3, the part, in the AI model, used to perform confidential calculation/sensitive calculation is separated from the AI model through a tool, to generate the security application module (denoted as TA). The AI model is divided into two parts. The security application module is separated from the AI model and is applied to a TEE system (i.e., IR subgraph generation, TEE subgraph in FIG. 3), and the AI model excluding the security application module is applied to a REE system (i.e., subgraph replacement, generation of REE model file in FIG. 3), so that the load for reasoning a framework inside the TEE is avoided. A layer that needs to be split out is considered comprehensively according to the security and performance requirements.

Optionally, splitting the preset data processing module from the machine learning model to generate the security application module in the step S202 includes: splitting, by a preset tool, the preset data processing module from the machine learning model, and generating the security application module according to the preset data processing module.

The preset tool is denoted as the tool herein. Combined with above FIG. 3, the tool splits the AI model, directly compiles a model that needs to be run on the TEE side to generate the TA (i.e., the security application module in the embodiment of the present application), and encrypts a text segment, rodata segment, and data segment of the TA or encrypts a configuration file. An encryption key is related to a public key of a manufacturer, thereby ensuring that different manufacturers have different encryption keys.

Specifically, the part, in the AI model, used to perform confidential calculation/sensitive calculation (i.e., the preset data processing module in the embodiment of the present application) is split through the preset tool, and the TA is generated according to the part used to perform confidential calculation/sensitive calculation.

Further, optionally, generating the security application module according to the preset data processing module, includes: optimizing and encrypting, by a heterogeneous accelerated compiler, the preset data processing module, to obtain the security application module.

Specifically, as shown in FIG. 3, in the embodiment of the present application, the split part, in the AI model, used to perform confidential calculation/sensitive calculation is optimized through the heterogeneous accelerated compiler, and finally is compiled to generate binary instructions. The tool is used to further encrypt the part for performing confidential calculation/sensitive calculation, to generate the encrypted TA.

It should be noted that, in the embodiment of the present application, different from the existing technologies, various reasoning frameworks are no longer integrated within the TEE, and the split model that needs to be run in the TEE is compiled by an AI compiler to generate a TA with unified format. A unified logic of operator and composition is realized inside the TEE, and an extended API is provided for the TA to call.

Optionally, optimizing and encrypting, by the heterogeneous accelerated compiler, the preset data processing module, to obtain the security application module, includes: configuring a network structure in the machine learning model to a specified position of the security application module; and encrypting the specified position of the security application module, to obtain the encrypted security application module.

Specifically, after the split AI model is compiled to generate the TA, parameters of this part of the AI model may be used as a Rodata segment or data segment of the TA, or as a separate configuration file. The network structure is reflected in the text segment of the TA, in the text segment and rodate segment of the TA, in the data segment of the TA, or in the configuration file, and the network structure is encrypted. The encrypted TA, or the encrypted TA and the configuration file are deployed on the device side. It is ensured that the encryption keys of individual manufacturers are different. The encrypted TA is signed by the manufacturer.

Herein, the text segment, i.e., a code segment, stores program codes, which has been determined before the running (determined when being compiled), and is usually read only.

The rodata segment, i.e., read only data, is a constant region. The rodata segment stores constant data.

The data segment stores a global variable that has been initialized.

Step S204, taking, through a preset operator, an output value of an operation layer in the split machine learning model as an input value to be input into the security application module, and inputting the input value into the security application module.

In the above step S204, in the embodiment of the present application, because the separate TA running in the TEE system is generated, the REE interacts, by configuring a custom operator (i.e., the preset operator in the embodiment of the present application) in the REE system, with the TA through the custom operator. In the process of interaction, all parts involved in reasoning, confidential or sensitive aspects are run in the TEE system (i.e., in the security environment), and the custom operator is run in the REE. The operation layer in the split machine model is, as shown in FIG. 3, the operation layer in the REE model. The output value of the operation layer in the REE is taken as an input value of the security application module TA by the custom operator.

Optionally, in the step S204, taking, through the preset operator, the output value of the operation layer in the split machine learning model as the input value to be input into the security application module, and inputting the input value into the security application module, includes in a case where the operation layer includes a first operation layer, acquiring, through the preset operator, an output value of the first operation layer in the split machine learning model; taking the output value as the input value to be input into the security application module, and inputting the input value into the security application module.

Figure 4:
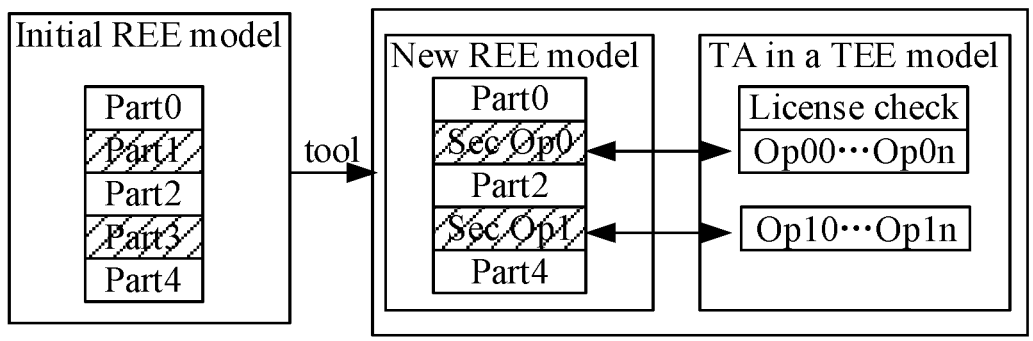
FIG. 4 is a schematic diagram illustrating the interaction between a REE system and a TEE system in the data processing method according to the first embodiment of the present application.

Specifically, based on the split of the AI model shown in FIG. 3, the AI model is divided into a part running in the TEE system and a part running in the REE system. FIG. 4 is a schematic diagram of interaction between the REE system and the TEE system in the data processing method according to the first embodiment of the present application. As shown in FIG. 4, by inserting (configuring) a custom operator (denoted as Sec Op0, Sec Op1) in the REE system, the custom operator is responsible for taking an output value of a front layer (i.e., the first operation layer in the embodiment of the present application) of the model custom operator in the REE system as an input value of the TEE, and inputting the input value into the TA in the TEE.

In the embodiment of the present application, the model that is split from the REE side is replaced with the custom operator, the custom operator is responsible for interacting with the TEE. For REE application developers, it may shield the differences caused by the introduction of hardware security, without changing original applications on the REE side.

Step S206, performing, through the security application module, subgraph calculation in an isolated operating environment according to the input value, to obtain a calculation result.

In the above step S206 of the present application, based on inputting the output value into the TA in the step S204, the reasoning part in the REE system is carried out in the TEE system, to generate the final calculation result by the TEE system.

Optionally, performing, through the security application module, the subgraph calculation in the isolated operating environment according to the input value, to obtain the calculation result in the step S206, includes detecting, according to the input value, whether there is use authorization for the split machine learning model; in a case where it is detected that there is the use authorization for the split machine learning model, or in a case where it is detected that no authorization is required for the split machine learning model, performing, through the security application module, the subgraph calculation in the isolated operating environment according to the input value, to obtain the calculation result; and in a case where it is detected that there is no use authorization for the split machine learning model, stopping the calculation.

Specifically, as shown in FIG. 4, for a model needing the use authorization, when the first split model part is calculated inside the TEE, the use authorization is checked to determine whether the device has an authority to use this model. It avoids that the logic of checking the use authorization separately on the REE side is bypassed by an attacker. If the model may be used without being authorized, license check in the TEE system (i.e., detecting whether there is use authorization for the split machine learning model in the embodiment of the present application) may be ignored.

Further, optionally, performing, through the security application module, the subgraph calculation in the isolated operating environment according to the input value, to obtain the calculation result, includes: allocating a corresponding application program interface according to the input value, and performing the subgraph calculation in the isolated operating environment according to the input value, to obtain the calculation result.

Specifically, as shown in FIG. 4, Sec Op0 (i.e., the preset operator in the embodiment of the present application) in the REE takes an output of Part 0 (the first operation layer in the embodiment of the present application) as an input of Op00 (operator) in the TA of the TEE, and the TEE outputs, through the calculation of operators Op00-Op0n, a calculation result of the operator Op0n as an input of the Part2 (as shown in FIG. 4, the second operation layer). In particular, when protection is performed on data input by a user, the first layer is split into the TEE system for calculation, and the first custom operator takes an input of the reasoning part as an input of the TEE.

In a model initialization stage, when the first custom operator is initialized, the TEE loads the TA, decrypts the TA or decrypts the TA and the configuration file. The composition is implemented in the TEE, the basic logic of the operator is taken as a general module, to provide an extended call API for the TA. The reasoning part of the split model of the REE system calculates in the TEE, an output of the REE side is received and taken as an input of the TEE for calculation, and a final result output by the TEE is taken as an input of a subsequent network layer on the REE side. Calculation results of middle layers are not exposed to the outside.

In the embodiment of the present application, unified AI composition and operator interfaces are defined within the TEE, thereby facilitating the connection of AI hardware acceleration chips.

Step S208, returning the calculation result to the preset operator.

Optionally, returning the calculation result to the preset operator, in the step S208, includes: in a case where the operation layer further includes a second operation layer, inputting the calculation result into the second operation layer in the split machine learning model, wherein the first operation layer is before the preset operator, and the second operation layer is after the preset operator.

Specifically, there are multiple layers (Part0, Part2, Part4, . . . ) on the REE system side, an output of the first layer is taken as an input of the TEE system side, and a large amount of calculations are concentrated on the TA side of the TEE system. Thus, after a calculation result output by the TEE system is obtained, the calculation result is taken as an input of a subsequent operation layer. Until there is a need to call the TA operation again, the part to be calculated is input into the TA in the TEE system, the TA performs calculation again, and the calculation result of the TA is input into the next operation layer of the REE system, as the input of this operation layer to continue the calculation.

For example, when the Part2 (i.e., the second operation layer in the embodiment of the present application) needs to call the TA, the reasoning part of the Part2 is input into operators Op10-Op1n of the TA by the operator Sec Op1. When the calculation result obtained by the operator Op1n is returned to the REE system, the calculation result is taken as the input of the Part4 (the third operation layer) for calculation again.

It should be noted that when the AI model in the embodiment of the present application is updated, only model files on the REE side and binary files or configuration files corresponding to the TA need to be updated. Moreover, the solution provided by the embodiment of the present application is applicable to different hardware carriers, such as intel sgx and arm trustzone. Model split is general, and the interactive mode of the REE and TEE via the custom operators, the format of the TA, and the composition and operator logic implementation in the TEE are related to the hardware carriers.

In the embodiments of the present application, a preset data processing module is split from a machine learning model, to generate a security application module, wherein the security application module is configured for performing encryption calculation on data input into the machine learning model, an output value of an operation layer in the split machine learning model is taken as an input value to be input into the security application module by a preset operator, and the input value is input into the security application module; the security application module performs subgraph calculation in an isolated operating environment according to the input value, to obtain a calculation result; and the calculation result is returned to the preset operator. The purpose of improving the computing power of the TEE is achieved, thereby achieving the technical effect that various reasoning frameworks are no longer integrated in the TEE, and corresponding application program call interfaces are provided for the TA that needs to run in the TEE, and in turn solving the technical problem of high computational pressure of the TEE model due to that different reasoning frameworks need to be adapted to different customer requirements in the TEE model in the related technologies.

Second Embodiment

Figure 5:
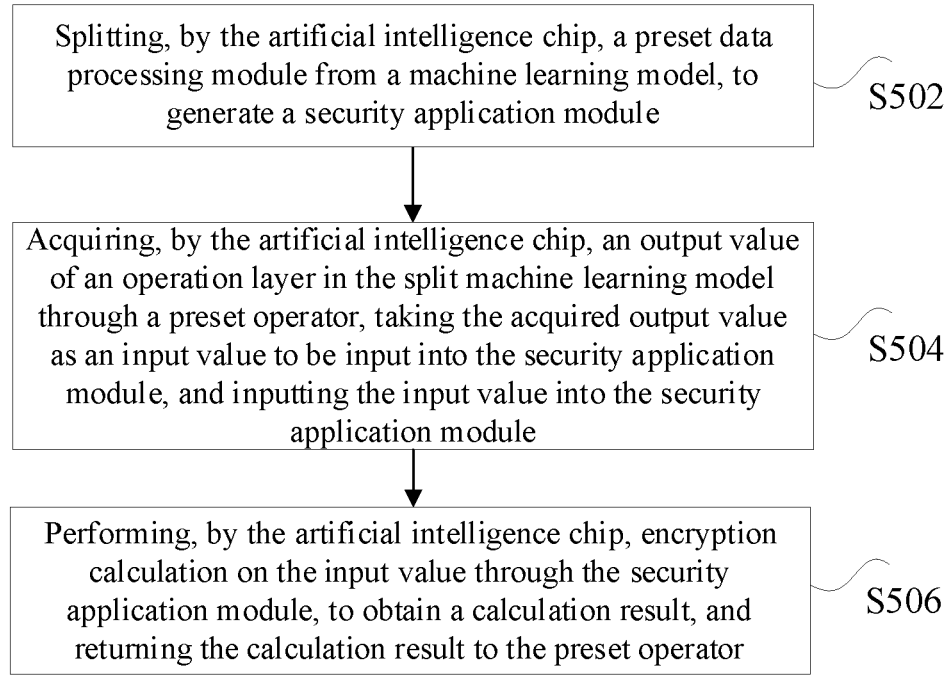
FIG. 5 is a schematic flow chart of a data processing method according to the second embodiment of the present application.

According to another aspect of the embodiments of the present application, a data processing method is provided, which is applied to an artificial intelligence chip. FIG. 5 is a schematic flow chart of a data processing method according to the second embodiment of the present application. As shown in FIG. 5, the data processing method includes flowing steps S502 to S506.

Step S502, splitting, by the artificial intelligence chip, a preset data processing module from a machine learning model, to generate a security application module.

Step S504, acquiring, by the artificial intelligence chip, an output value of an operation layer in the split machine learning model through a preset operator, taking the acquired output value as an input value to be input into the security application module, and inputting the input value into the security application module.

Step S506, performing, by the artificial intelligence chip, encryption calculation on the input value through the security application module, to obtain a calculation result, and returning the calculation result to the preset operator.

In summary, combined with the step S502 to the step S506, the data processing method provided by the embodiment of the present application may be applied to an artificial intelligence chip, i.e., an AI chip. Herein, the machine learning model in the embodiment of the present application may be an AI model. The preset data processing module may be a part, in the AI model, used to perform confidential calculation/sensitive calculation. The part, in the AI model, used to perform confidential calculation/sensitive calculation is separated from the AI model through a tool, to generate a security application module (denoted as TA). The AI model is divided into two parts. The security application module is separated from the AI model and is applied to a TEE system, and the AI model excluding the security application module is applied to a REE system, so that the load for reasoning a framework inside the TEE is avoided. A layer that needs to be split out is considered comprehensively according to the security and performance requirements.

The split part, in the AI model, used to perform confidential calculation/sensitive calculation is optimized through a heterogeneous accelerated compiler, and finally is compiled to generate binary instructions. The tool is used to further encrypt the part for performing confidential calculation/sensitive calculation, to generate the encrypted TA.

It should be noted that, in the embodiment of the present application, different from the existing technologies, various reasoning frameworks are no longer integrated within the TEE, and the split model that needs to be run in the TEE is compiled by an AI compiler to generate a TA with unified format. A unified logic of operator and composition is realized inside the TEE, and an extended API is provided for the TA to call.

Specifically, after the split AI model is compiled to generate the TA, parameters of this part of the AI model may be used as a Rodata segment or data segment of the TA, or as a separate configuration file. The network structure is reflected in the text segment of the TA, in the text segment and rodate segment of the TA, in the data segment of the TA, or in the configuration file, and the network structure is encrypted. The encrypted TA, or the encrypted TA and the configuration file are deployed at the device side. It is ensured that the encryption keys of individual manufacturers are different. The encrypted TA is signed by the manufacturer.

In addition, in the part of the REE system, by inserting (configuring) a custom operator (denoted as Sec Op0, Sec Op1) in the REE system, the custom operator is responsible for taking an output value of a front layer of the model custom operator in the REE system as an input value of the TEE, and inputting the input value into the TA in the TEE.

In the embodiment of the present application, the model that is split from the REE side is replaced with the custom operator, the custom operator is responsible for interacting with the TEE. For REE application developers, it may shield the differences caused by the introduction of hardware security, without changing original applications on the REE side.

In the end, the reasoning part of the REE system is run in the TEE system, and the final calculation result is generated by the TEE system.

It should be explained that, for the aforementioned respective method embodiment, for the sake of simple description, the method embodiment is expressed as a combination of a series of actions. However, those skilled in the art should know that the present application is not limited by the described action sequence, because according to the present application, some steps may be performed in other orders or simultaneously. Secondly, those skilled in the art should also know that the embodiments described in the specification are preferred embodiments, and the actions and modules involved are not necessarily required for the present application.

Through the description of the above embodiments, those skilled in the art may clearly understand that the data processing method according to the above embodiments may be implemented by means of software and a necessary general-purpose hardware platform. Of course, the data processing method according to the above embodiments may also be implemented by hardware. In many cases, the former is a better implementation. Based on such understanding, the essence of the technical solution of the present application or the part that makes a contribution over the prior art may be embodied in the form of a software product. The computer software product is stored in a storage medium (such as a ROM/RAM, a disk, an optical disk), and contains several instructions to enable a terminal device (which may be a mobile phone, a computer, a server, or a network device, etc.) to perform the methods described in various embodiments of the present application.

Third Embodiment

Figure 6:
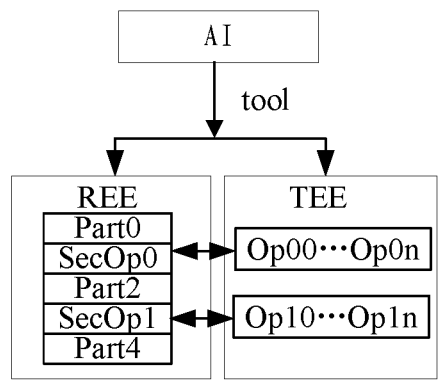
FIG. 6 is a schematic diagram of a data processing system according to the third embodiment of the present application.

According to another aspect of the embodiments of the present application, a data processing system is provided. FIG. 6 is a schematic diagram of a data processing system according to the third embodiment of the present application. As shown in FIG. 6, the data processing system includes: a machine learning model, a preset tool, a first execution environment, and a second execution environment. Herein, the machine learning model includes a preset data processing module. The preset data processing module is obtained by splitting from the machine learning model through the preset tool, and the preset data processing module is configured in the first execution environment, to generate a security application module. The split machine learning model is configured in the second execution environment. The second execution environment is configured for collecting data, taking the collected data as an input value which is to be input into the security application module in the first execution environment, inputting the input value into the security application module through a preset operator, and receiving a calculation result through the preset operator, wherein the calculation result is obtained by performing, through the security application module in the first execution environment, encryption calculation on the input value.

Specifically, as shown in FIG. 6, the machine learning model in the data processing system provided by the embodiment of the present application is marked as AI, the preset tool is marked as tool, the first execution environment is marked as TEE, the second execution environment is marked as REE, the security application module is marked as TA, and the preset operators in the REE are marked as SecOp0, SecOp1, . . . .

In the embodiment of the present application, the AI model is divided into two parts by the tool. The part that performs confidential calculation/sensitive calculation is configured in the TEE, to generate the TA. The rest of the AI model is configured in the REE. The REE collects data, and inputs the collected data, as data to be kept confidential, into operators Op00 . . . Op0n and Op10 . . . Op1n of the TA in the TEE through the preset operators SecOp0, SecOp1 . . . . In the process of performing specific calculations, an output value (i.e., the data to be kept confidential in the embodiment of the present application) of the first operation layer Part0 of the REE is input into the operators Op00 . . . Op0n of the TA in the TEE through the preset operator SecOp0. After the Op0n outputs a calculation result, the calculation result is fed back to the SecOp0 as an input value of Part2, and an output value of the Part2 is input into the operators Op10 . . . Op1n of the TA in the TEE through the SecOp1 After the Op1n outputs a calculation result, the calculation result is fed back to the SecOp1, as an input value of Part4, and then the loop calculations are continued.

Fourth Embodiment

Figure 7:
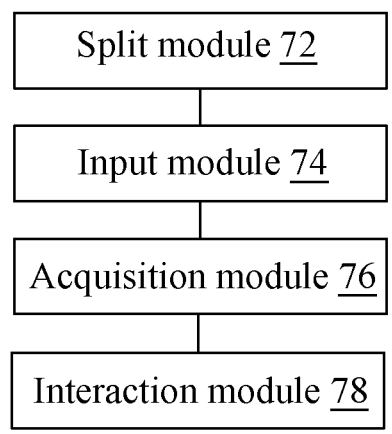
FIG. 7 is a schematic diagram of a data processing apparatus according to the fourth embodiment of the present application.

According to an embodiment of the present application, an apparatus for implementing the above data processing method is also provided. FIG. 7 is a schematic diagram of a data processing apparatus according to the fourth embodiment of the present application. As shown in FIG. 7, the data processing apparatus provided by the embodiment of the present application includes: a split module 72, configured for splitting a preset data processing module from a machine learning model, to generate a security application module, wherein the security application module is configured for performing encryption calculation on data input into the machine learning model; an input module 74, configured for taking, through a preset operator, an output value of an operation layer in the split machine learning model as an input value to be input into the security application module, and inputting the input value into the security application module; an acquisition module 76, configured for performing, through the security application module, subgraph calculation in an isolated operating environment according to the input value, to obtain a calculation result; and an interaction module 78, configured for returning the calculation result to the preset operator.

Fifth Embodiment

According to another aspect of the embodiments of the present application, a non-volatile storage medium is also provided. The non-volatile storage medium includes a stored program. The program, when running, controls a device where the non-volatile storage medium is located to perform the method in the above first or second embodiment.

Sixth Embodiment

According to another aspect of the embodiments of the present application, a processor is also provided. The processor is configured for running a program. The program, when running, performs the method in the above first or second embodiment.

Seventh Embodiment

An embodiment of the present application also provides a storage medium. Optionally, in this embodiment, the storage medium may be used to save program codes performed for the data processing method provided by the above first embodiment.

Optionally, in this embodiment, the storage medium may be located in any computer terminal in a group of computer terminals in a computer network, or in any mobile terminal in a group of mobile terminals.

Optionally, in this embodiment, the storage medium is set to store program codes for performing the following steps: splitting a preset data processing module from a machine learning model, to generate a security application module, wherein the security application module is configured for performing encryption calculation on data input into the machine learning model; taking, through a preset operator, an output value of an operation layer in the split machine learning model as an input value to be input into the security application module, and inputting the input value into the security application module; performing, through the security application module, subgraph calculation in an isolated operating environment according to the input value, to obtain a calculation result; and returning the calculation result to the preset operator.

Optionally, in this embodiment, the storage medium is set to store program codes for performing the following steps, the splitting the preset data processing module from the machine learning model, to generate the security application module, includes: splitting, by a preset tool, the preset data processing module from the machine learning model, and generating the security application module according to the preset data processing module.

Further, optionally, in this embodiment, the storage medium is set to store program codes for performing the following steps: the generating the security application module according to the preset data processing module, includes, optimizing and encrypting, by a heterogeneous accelerated compiler, the preset data processing module, to obtain the security application module.

Optionally, in this embodiment, the storage medium is set to store program codes for performing the following steps: the optimizing and encrypting, by the heterogeneous accelerated compiler, the preset data processing module, to obtain the security application module, includes: configuring a network structure in the machine learning model to a specified position of the security application module; and encrypting the specified position of the security application module, to obtain the encrypted security application module.

Optionally, in this embodiment, the storage medium is set to store program codes for performing the following steps: the taking, through the preset operator, the output value of the operation layer in the split machine learning model as the input value to be input into the security application module, and inputting the input value into the security application module, includes: in a case where the operation layer includes a first operation layer, acquiring, through the preset operator, an output value of the first operation layer in the split machine learning model; taking the output value as the input value to be input into the security application module; and inputting the input value into the security application module.

Further, optionally, in this embodiment, the storage medium is set to store program codes for performing the following steps: the performing, through the security application module, the subgraph calculation in the isolated operating environment according to the input value, to obtain the calculation result, includes: detecting, according to the input value, whether there is use authorization for the split machine learning model; in a case where it is detected that there is the use authorization for the split machine learning model, or in a case where it is detected that no authorization is required for the split machine learning model, performing, through the security application module, the subgraph calculation in the isolated operating environment according to the input value, to obtain the calculation result; and in a case where it is detected that there is no use authorization for the split machine learning model, stopping the calculation.

Optionally, in this embodiment, the storage medium is set to store program codes for performing the following steps: the performing, through the security application module, the subgraph calculation in the isolated operating environment according to the input value, to obtain the calculation result, includes: allocating a corresponding application program interface according to the input value, and performing the subgraph calculation in the isolated operating environment according to the input value, to obtain the calculation result.

Further, optionally, in this embodiment, the storage medium is set to store program codes for performing the following steps: the returning the calculation result to the preset operator, includes: in a case where the operation layer further includes a second operation layer, inputting, through the preset operator, the calculation result into the second operation layer in the split machine learning model; wherein the first operation layer is before the preset operator, and the second operation layer is after the preset operator.

The serial numbers of the above embodiments of the present application are only for the purpose of description, which does not represent the strengths and weaknesses of the embodiments.

In the above embodiments of the present application, the description of each embodiment has its own emphases. A portion that is not described in detail in a certain embodiment may be referred to the relevant descriptions in other embodiments.

In the several embodiments provided by the present application, it should be understood that the disclosed technical contents may be implemented in other ways. The apparatus embodiments described above are only illustrative. For example, the division of units is only a logical function division, and there may be another division way in actual implementations. For example, multiple units or components may be combined or may be integrated into another system, or some features may be omitted, or not implemented. In another point, mutual coupling or direct coupling or communication connection shown or discussed may be implemented through some interfaces, and indirect coupling or communication connection of the units or modules may be implemented in electrical or other forms.

The units described as separate components may or may not be physically separated. The parts displayed as units may or may not be physical units, that is, they may be located in one place, or may also be distributed to multiple network units. Part or all of the units may be selected according to actual needs, to achieve the purpose of the solution of the embodiments.

In addition, the respective functional units in each embodiment of the present application may be integrated in one processing unit, or the respective units may exist separately physically, or two or more units may be integrated in one unit. The above integrated unit may be realized in the form of hardware or in the form of software function unit.

If the integrated unit is realized in the form of software function unit, and is sold or used as an independent product, it may be stored in a computer-readable storage medium. Based on this understanding, the essence of the technical solution of the present application, or the part that makes a contribution over the prior art, or all or part of the technical solution may be embodied in the form of a software product. The computer software product is stored in a storage medium, including several instructions to enable a computer device (which may be a personal computer, a server, or a network device, etc.) to perform all or part of the steps of the methods described in various embodiments of the present application. The aforementioned storage medium includes various media that may store program codes, such as U disk, read-only memory (ROM), random access memory (RAM), mobile hard disk, magnetic disk or optical disk, etc.

The above are only the preferred embodiments of the present application. It should be pointed out that for those of ordinary skill in the art, some improvements and modifications may also be made without departing from the principle of the present application. These improvements and modifications should also fall within the protection scope of the present application.

What is claimed is:

1. A data processing method, comprising:
splitting, by a preset tool, a preset data processing module from a machine learning model;
generating a security application module according to the preset data processing module, wherein the security application module is configured for performing an encryption calculation on data input into the machine learning model, and wherein the generating the security application module according to the preset data processing module further comprises:
optimizing and encrypting, by a heterogeneous accelerated compiler, the preset data processing module, to obtain the security application module;
taking, through a preset operator, an output value of an operation layer in the split machine learning model as an input value to be input into the security application module, and inputting the input value into the security application module;
performing, through the security application module, a subgraph encryption calculation in an isolated operating environment according to the input value, to obtain a calculation result; and
returning the calculation result to the preset operation.

2. The method of claim 1, wherein the optimizing and encrypting, by the heterogeneous accelerated compiler, the preset data processing module, to obtain the security application module, comprises:
configuring a network structure in the machine learning model to a specified position of the security application module; and
encrypting the specified position of the security application module, to obtain the encrypted security application module.

3. The method of claim 1, wherein the taking, through the preset operator, the output value of the operation layer in the split machine learning model as the input value to be input into the security application module, and inputting the input value into the security application module, comprises:
in a case where the operation layer comprises a first operation layer, acquiring, through the preset operator, an output value of the first operation layer in the split machine learning model;
taking the output value as the input value to be input into the security application module; and
inputting the input value into the security application module.

4. The method of claim 3, wherein the performing, through the security application module, the subgraph encryption calculation in the isolated operating environment according to the input value, to obtain the calculation result, comprises:

detecting, according to the input value, whether there is use authorization for the split machine learning model;

in a case where it is detected that there is the use authorization for the split machine learning model, or in a case where it is detected that no authorization is required for the split machine learning model, performing, through the security application module, the subgraph encryption calculation in the isolated operating environment according to the input value, to obtain the calculation result; and in a case where it is detected that there is no use authorization for the split machine learning model, stopping the calculation.

5. The method of claim 4, wherein the performing, through the security application module, the subgraph encryption calculation in the isolated operating environment according to the input value, to obtain the calculation result, comprises:

allocating a corresponding application program interface according to the input value, and performing the subgraph encryption calculation in the isolated operating environment according to the input value, to obtain the calculation result.

6. The method of claim 5, wherein the returning the calculation result to the preset operator, comprises:

in a case where the operation layer further comprises a second operation layer, inputting, through the preset operator, the calculation result into the second operation layer in the split machine learning model, wherein the first operation layer is before the preset operator, and the second operation layer is after the preset operator.

7. A non-transitory computer readable storage medium, comprising a stored program, wherein the program, when running, controls a device where the non-transitory computer readable storage medium is configured to perform the method of claim 1.

8. A processor, configured for running a program, wherein the program, when running, performs the method of claim 1.

9. A data processing method, applied to an artificial intelligence chip, comprising:

splitting, by the artificial intelligence chip and via a preset tool, a preset data processing module from a machine learning model;

generating a security application module according to the preset data processing module, wherein the generating the security application module according to the preset data processing module comprises:

optimizing and encrypting, by a heterogeneous accelerated compiler, the preset data processing module, to obtain the security application module;

acquiring, by the artificial intelligence chip, an output value of an operation layer in the split machine learning model through a preset operator, taking the acquired output value as an input value to be input into the security application module, and inputting the input value into the security application module; and performing, by the artificial intelligence chip, an encryption calculation on the input value through the security application module, to obtain a calculation result, and returning the calculation result to the preset operator.

10. A data processing system, comprising:
a memory storing computer executable instructions; and
a processor configured to execute the computer executable instructions stored in the memory to perform operations, the operations comprising:

splitting, by a preset tool, a preset data processing module from a machine learning model;

generating a security application module according to the preset data processing module, wherein the security application module is configured for performing an encryption calculation on data input into the machine learning model, and wherein generating the security application module further comprises:

optimizing and encrypting, by a heterogeneous accelerated compiler, the preset data processing module, to obtain the security application module;

taking, through a preset operator, an output value of an operation layer in the split machine learning model as an input value to be input into the security application module, and inputting the input value into the security application module;

performing, through the security application module, a subgraph encryption calculation in an isolated operating environment according to the input value, to obtain a calculation result; and returning the calculation result to the preset operator.

11. The system of claim 10, wherein the processor is further configured to perform operations comprising:

configuring a network structure in the machine learning model to a specified position of the security application module; and encrypting the specified position of the security application module, to obtain the encrypted security application module.

12. The system of claim 10, wherein the processor is further configured to perform operations comprising:

in a case where the operation layer in the split machine learning module comprises a first operation layer, acquiring, through the preset operator, an output value of the first operation layer in the split machine learning model;

taking the output value as the input value to be input into the security application module; and inputting the input value into the security application module.

13. The system of claim 12, wherein the processor is further configured to perform operations comprising:

detecting, according to the input value, whether there is use authorization for the split machine learning model;

in a case where it is detected that there is the use authorization for the split machine learning model, or in a case where it is detected that no authorization is required for the split machine learning model, performing, through the security application module, the encryption calculation in the isolated operating environment according to the input value, to obtain the calculation result; and in a case where it is detected that there is no use authorization for the split machine learning model, stopping the calculation.

14. The system of claim 13, wherein the processor is further configured to perform operations comprising:

allocating a corresponding application program interface according to the input value, and performing the encryption calculation in the isolated operating environment according to the input value, to obtain the calculation result.

15. The system of claim 14, wherein the processor is further configured to perform operations comprising:
  in a case where the operation layer further comprises a second operation layer, inputting, through the preset operator, the calculation result into the second operation layer in the split machine learning model, wherein the first operation layer is before the preset operator, and the second operation layer is after the preset operator.

* * * * *